US008074826B2

(12) United States Patent
Cronin et al.

(10) Patent No.: US 8,074,826 B2
(45) Date of Patent: Dec. 13, 2011

(54) DAMAGE AND LEAKAGE BARRIER IN ALL-COMPOSITE PRESSURE VESSELS AND STORAGE TANKS

(75) Inventors: John Cronin, Denver, CO (US); Kaushik Mallick, Broomfield, CO (US); Mark Lake, Erie, CO (US); Mark Warner, Foothills Ranch, CA (US); Naseem Munshi, Lafayette, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 445 days.

(21) Appl. No.: 12/145,255

(22) Filed: Jun. 24, 2008

(65) Prior Publication Data

US 2009/0314785 A1 Dec. 24, 2009

(51) Int. Cl.
*F17C 1/00* (2006.01)
*F17C 1/02* (2006.01)
*F17C 1/06* (2006.01)
*B29C 53/58* (2006.01)
*B65H 81/00* (2006.01)
*B65D 1/40* (2006.01)
*B65D 8/04* (2006.01)

(52) U.S. Cl. ........... 220/589; 220/62.11; 220/62.19; 220/581; 220/586; 220/588; 220/590; 156/173; 156/305; 206/0.6

(58) Field of Classification Search ............ 220/62.11, 220/62.19, 581, 586, 588, 589, 590, FOR. 166, 220/FOR. 167; 156/173, 305; 206/0.6
See application file for complete search history.

(56) References Cited

U.S. PATENT DOCUMENTS

| 2,744,043 A | 5/1956 | Ramberg |
| 3,215,576 A | 11/1965 | Huff |
| 3,260,398 A | 7/1966 | Levenetz |
| 3,372,075 A * | 3/1968 | Holt et al. .................... 156/172 |
| 3,765,557 A | 10/1973 | Giwer |
| 3,969,812 A | 7/1976 | Beck |
| 4,053,081 A | 10/1977 | Minke |
| 4,504,530 A | 3/1985 | Bliley |
| 4,614,279 A | 9/1986 | Toth et al. |
| 5,025,943 A | 6/1991 | Forsman |
| 5,127,399 A | 7/1992 | Scholley |

(Continued)

OTHER PUBLICATIONS

Beard, Shawn et al., "Design of Braided Composite Tubes for Energy Absorption," American Inst. of Aeronautics & Astronautics, 42$^{nd}$ AIAA/ASM/ASCE/AHS/ASC Structures, Structural Dynamics and Materials Conference and Exhibit, Seattle, WA, Apr. 16-19, 2001, pp. 1-6.

Harte, Anne-Marie et al., "Energy Absorption of Foam-Filled Circular Tubes with Braided Composite Walls," Eur. J. Mech. A/Solids, 19 (2000), pp. 31-50.

Harte, Anne-Marie et al., "On the Mechanics of Braided Composites in Tension," Eur. J. Mech. A/Solids, 19 (2000), pp. 259-275.

(Continued)

*Primary Examiner* — Anthony Stashick
*Assistant Examiner* — Madison L Wright
(74) *Attorney, Agent, or Firm* — Kilpatrick Townsend & Stockton LLP

(57) ABSTRACT

A linerless tank structure has a body that defines an enclosed interior volume. The body has a cylindrical section having an axis of symmetry and a dome section coupled with the cylindrical section. The construction of the pressure vessel includes multiple fiber plies. At least one of the fiber plies is a helical ply having fibers traversing the dome helically about the axis of symmetry. At least a second of the fiber plies is a braided or woven ply.

17 Claims, 6 Drawing Sheets

U.S. PATENT DOCUMENTS

| | | | |
|---|---|---|---|
| 5,150,812 A | 9/1992 | Adams | |
| 5,227,208 A | 7/1993 | Thongs, Jr. | |
| 5,287,987 A | 2/1994 | Gaiser | |
| 5,375,735 A | 12/1994 | Huvey et al. | |
| 5,385,263 A | 1/1995 | Kirk et al. | |
| 5,499,739 A | 3/1996 | Greist, III et al. | |
| 5,518,141 A | 5/1996 | Newhouse et al. | |
| 5,522,340 A * | 6/1996 | Skogman | 114/357 |
| 5,647,503 A | 7/1997 | Steele et al. | |
| 5,798,156 A | 8/1998 | Mitlitsky et al. | |
| 5,816,426 A | 10/1998 | Sharp | |
| 6,063,277 A * | 5/2000 | Bennett et al. | 210/321.78 |
| 6,145,693 A | 11/2000 | Berglund | |
| 6,230,922 B1 | 5/2001 | Rasche et al. | |
| 6,354,444 B1 | 3/2002 | Mahendran et al. | |
| 6,444,071 B1 | 9/2002 | Ayorinde | |
| 6,510,961 B1 | 1/2003 | Head et al. | |
| 6,554,939 B1 | 4/2003 | Murphy | |
| 6,796,453 B2 | 9/2004 | Sanders | |
| 6,898,373 B2 | 5/2005 | Jackson | |
| 6,926,939 B2 | 8/2005 | Hargett, Jr. et al. | |
| 2002/0176954 A1 | 11/2002 | Hargett, Jr. et al. | |
| 2003/0019874 A1 | 1/2003 | Wright et al. | |
| 2005/0260373 A1 | 11/2005 | DeLay et al. | |
| 2006/0054628 A1 | 3/2006 | Matsuoka et al. | |
| 2006/0151506 A1 | 7/2006 | Koppert et al. | |
| 2006/0169704 A1 * | 8/2006 | Brunnhofer | 220/581 |

OTHER PUBLICATIONS

Nguyen, Thao D. et al., "Elastic Properties of Large Tow 2-D Braided Composites by Numerical and Analytical Methods," Lawrence Livermore National Laboratory, Sep. 1, 1998, pp. 1-25.

Tate, Jitendra S. et al., "Failure Analysis of Biaxial Braided Composites Under Fatigue Loading," Department of Mechanical Engineering, NC A&T State Univ., Greensboro, NC, no date, pp. 1-8.

Smith, Lloyd V. et al., "Strength Design with 2-D Triaxial Braid Textile Composites," Composites Science and Technology, 56 (1996), pp. 359-365.

Smith, L. V. et al., "Micro-Mechanics Parameters Controlling the Strength of Braided Composites," Composites Science and Technology, 54 (1995), pp. 177-184.

Scott Self Contained Breathing Apparatus SCBA, Scott Air-Pak-Enhanced design with IDLH dependability, p. 340, no date.

NIOSH Alert, Reducing the Potential Risk of Developing Cancer form Exposure to Gallium Arsenide in the Microelectronics Industry, Oct. 1987, DHHS (NIOSH) Publication No. 88-100, pp. 1-8.

MSA The Safety Company, 2005 Annual Report, 2005, pp. 1-7.

Metec Corporation, SCBA Composite Cylinder Product Description, obtained online at http://www.alibaba.com/catalog/10974203/SCBA_Composite_Cylinder.html, pp. 1-3.

* cited by examiner

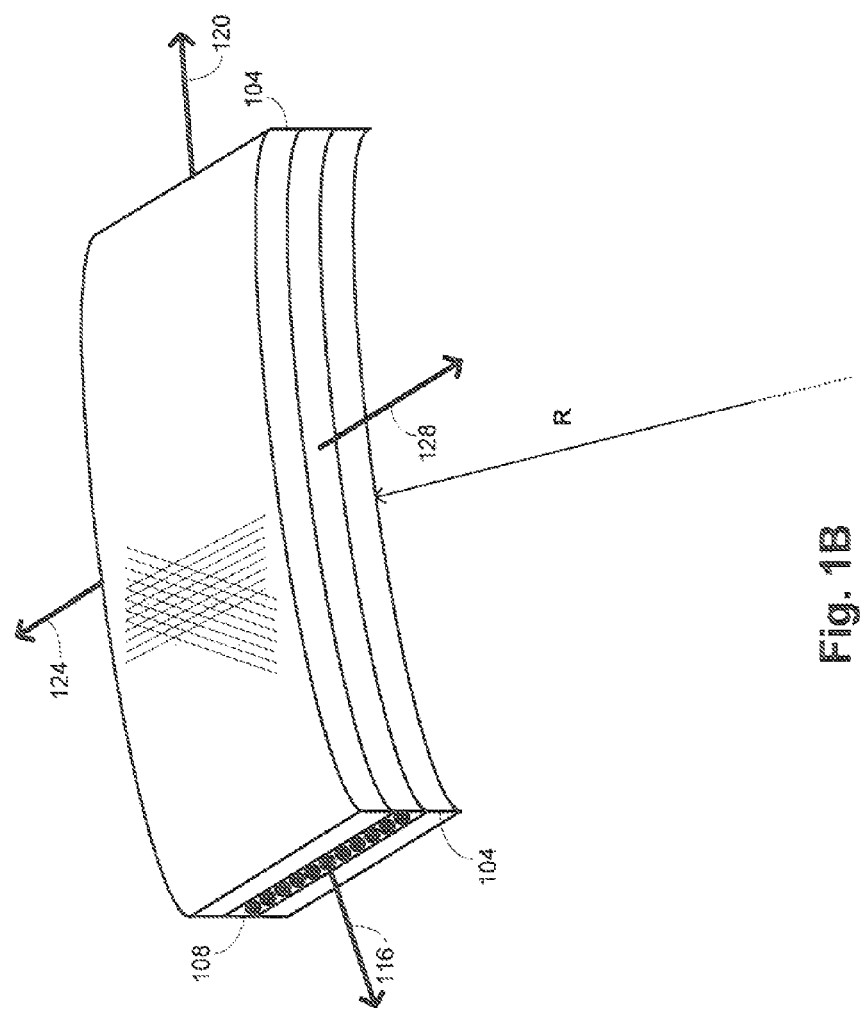
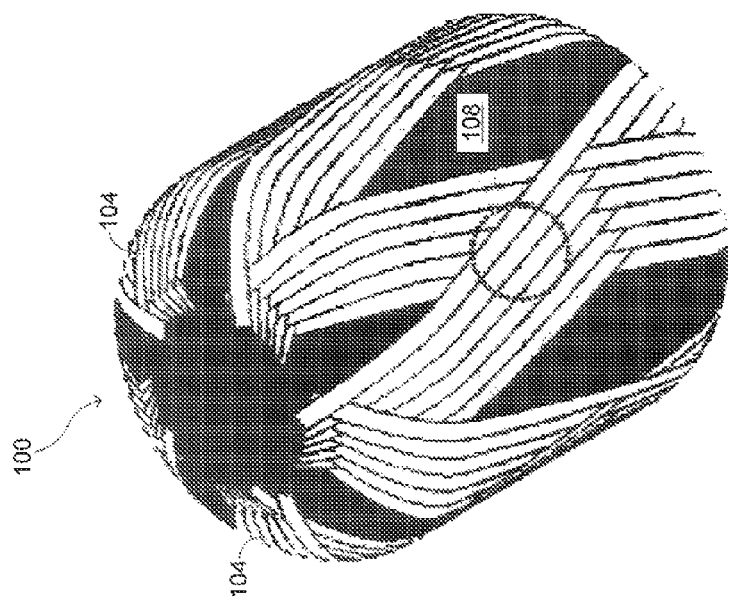
Fig. 1A
Fig. 1B

DAMAGE AND LEAKAGE BARRIER IN ALL-COMPOSITE PRESSURE VESSELS AND STORAGE TANKS

BACKGROUND OF THE INVENTION

This application relates primarily to pressure vessels. More specifically, this application relates to composite-overwrapped pressure vessels and all-composite pressure vessels. This application also relates to composite-overwrapped and all-composite tanks for storage of liquids and/or gases at relatively low pressures.

Pressure vessels and storage tanks find application in a wide assortment of industries. In certain industries, there is a particularly acute need for the pressure vessels to be of light weight. Some examples of these applications include the use of pressure vessels in self-contained breathing apparatus (SCBA) and gaseous fuel storage systems for automobiles, such as storage of compressed natural gas or hydrogen gas. In other applications, lightweight composite pressure vessels and storage tanks may be used on aircraft, launch vehicles, and spacecraft for chemical storage, transport, and/or mixing.

There are a number of different types of structures used for pressure vessels and storage tanks. Using a nomenclature common in the art, Type-I pressure vessels are fabricated of metal, Type-II pressure vessels are partially overwrapped metallic tanks, Type-III pressure vessels are composite-overwrapped structures that are lined with metal, and Type-IV pressure vessels are composite-overwrapped structures that are lined with a polymer. Of particular interest are "Type-V" pressure vessels, which are defined here as all-composite pressure vessels. Such pressure vessels may be especially suitable for lightweight applications like those identified above because they are projected to provide a weight reduction up to 25% when compared with conventional metal- or polymer-lined pressure vessels. Furthermore, Type-V pressure vessels have the potential of being manufactured more cheaply than Type-III and Type-IV pressure vessels due to the elimination of costly metal or polymer liners.

The composite outer layer on conventional composite-overwrapped pressure vessels with either metallic or polymeric liners is typically designed to safeguard against structural failure by rupture, while the liner is designed to contain the enclosed fluid. This effectively decouples the structural design of the pressure vessel from its fluid-containment requirements. There are three practical results of this decoupling of design requirements. First, the liners in Type-III and Type-IV pressure vessels are not mass-efficient in reacting the internal pressure load of the pressure vessel, which makes the liners a source of parasitic weight. Second, essentially the mode of failure in all lined pressure vessels (i.e., Type-III and Type-IV) when over-pressurized is catastrophic rupture of the structural shell—rather than leakage through the liner. However, for many applications, "leak-before-burst" failure performance, both under monotonic and cyclic pressurization, is desirable because it greatly reduces the likelihood of catastrophic failures of pressure vessels resulting in injury or death. Third, the liners in Type-III and Type-IV pressure vessels are, by definition, made of different materials than the composite outer shells. Hence, Type-III and Type-IV pressure vessels have performance limitations due to their use of dissimilar materials (e.g., limitations due to differential thermal-expansion, buckling and galvanic corrosion effects).

To address the first result above and in order to minimize the weight of composite pressure vessels, it is desirable to either eliminate the liner, or make the liner from a composite material that participates in reacting the internal pressure load in a mass efficient manner, while also preventing leakage of the contents.

To address the second result above and in order to design composite pressure vessels to exhibit a benign "leak-before-burst" failure mode, it is desirable to either eliminate the liner or design the liner such that it fails, predictably, before the composite outer shell fails.

To address the third result above and in order to eliminate performance limitations due to the use of dissimilar materials, it is desirable to either eliminate the liner or design the liner using a composite material that provides similar thermal, electrical and mechanical performance to the composite material used in the outer shell.

Past efforts to develop linerless composite pressure vessels and composite liners for composite-overwrapped pressure vessels have resulted in some successes. However, performance limitations of typical composite materials (i.e., lower-than-desired design operating strains) have typically resulted in higher-than-desired weights and/or un-predictable leakage and failure performance, in the case of linerless composite pressure vessels. Similarly, inadequate design, lack of precise failure prediction and improper material selection have resulted in composite liners that represent only an incremental improvement over traditional polymer and metallic liners.

There is accordingly a general need in the art for improved composite-lined and linerless, all-composite pressure vessel structures.

BRIEF SUMMARY OF THE INVENTION

Embodiments of the invention provide all-composite pressure vessel structures that incorporate the use of braided- or woven-fiber reinforcement and/or highly ductile resin materials in constructing layers (or plies) within the composite wall that provide superior barrier against leakage, while also contributing substantially to the stiffness and strength of the composite wall. Highly ductile resin materials incorporated into either the braided- or woven-fiber plies provide resistance to the initiation of microcracks. The braided- or woven-fiber plies provide a tough protective barrier against the propagation of manufacturing flaws, voids and resin microcracks when a composite pressure vessel is pressurized monotonically or subjected to pressure cycles during service.

When properly designed into the internal layers of an all-composite pressure vessel, the braided- or woven-fiber plies and/or highly ductile resin materials provide superior barrier performance, which significantly increases the pressure needed to cause a failure by leakage or by rupture in an all-composite pressure vessel. Furthermore, braided- or woven-fiber plies can be designed to exhibit very predictable stiffness and strain-to-failure performance, which can lead to efficient structural load sharing between the barrier plies and the outer structural plies, and highly predictable strain-to-leakage performance in the barrier plies.

In a first set of embodiments, the all-composite pressure vessel or storage tank structure comprises a body that defines an enclosed interior volume. The cross section of the pressure vessel or storage tank structure has a plurality of fiber-reinforced-polymer plies. At least one or one set of the fiber-reinforced polymer plies is designed to provide a barrier to leakage and/or damage due to impact, while also providing some fraction of the total required stiffness and strength of the pressure vessel structure. The other (i.e., non-barrier) plies are designed to provide the remaining required stiffness and strength to the pressure vessel structure.

A critical aspect to the design of the barrier ply (or plies) is that its first mode of failure under pressurization is rupture of the fiber reinforcement, confined to the barrier plies, leading to leakage of the pressurized contents. This fiber-dominated failure mode is intended to be very predictable, which enables the design of all-composite pressure vessel structures that exhibit highly repeatable and predictable leakage failure responses. In order to ensure fiber rupture as a first mode of failure, the barrier ply (or plies) must incorporate a highly ductile resin material that provides resistance to the initiation and propagation of microcracks up to strains that exceed the rupture strain capacity of the fiber reinforcement.

The barrier ply (or plies) may comprise of a braided, woven, filament wound or a combination of fiber arrangements in different embodiments. Braided- or woven-fiber plies provide protection against the propagation of manufacturing flaws, voids and resin microcracks when a composite pressure vessel is pressurized monotonically or subjected to pressure cycles during service, so various embodiments of braided- or woven-fiber plies can result in desirable barrier performance.

In one embodiment, the braided or woven barrier ply comprises a set of first fibers and a set of second fibers, with each of the second fibers intersecting one or more of the first fibers at an angle that results in uniform, or nearly uniform, tensioning of both sets of fibers in reaction to internal pressurization of the pressure vessel. As internal pressure is increased, the tension forces within the fibers increase nearly uniformly until the burst strength of all fibers is exceeded. This "isotensoid" (uniformly tensioned) embodiment of the barrier design is intended to lead to very efficient load-sharing performance between the barrier and non-barrier plies, and uniform failure strength of the barrier in either direction of loading.

In another embodiment, the braided or woven barrier ply comprises a set of first fibers and a set of second fibers, with each of the second fibers intersecting one or more of the first fibers at an angle that results in non-uniform tensioning of both sets of fibers in reaction to internal pressurization of the pressure vessel. As internal pressure is increased, the tension forces within one set of fibers increases more rapidly than the tension forces within the other set of fibers. This embodiment of the barrier design is intended to lead to preferential failure of the barrier in one particular direction (i.e., the direction of the more-highly loaded fibers).

In another embodiment, the braided or woven barrier ply comprises more than two different sets of fibers (e.g., triaxial weave) whose angles and relative tensile-loads can be adjusted to achieve a variety of effects on stiffness and strength performance.

In another embodiment, the braided or woven barrier ply comprises more than one type of reinforcement (carbon, glass, aramid, Zylon, Spectra, Dyneema etc) or a combination such that the properties can be adjusted to achieve a variety of effects on stiffness and strength performance.

In another embodiment, the fibers in the barrier plies might be applied through filament winding or fiber placement with fibers placed at two or more intersecting angles.

In some instances, the barrier plies are the first set of composite plies inside the pressure vessel. In one instance, one or more non-barrier plies may be disposed between two of the barrier plies. In another instance, the barrier ply (or plies) may be disposed between two of the non-barrier plies. In still other instances, a plurality of barrier plies may be interleaved with a plurality of non-barrier plies.

In some instances, the barrier plies traverse all sections of the pressure vessel. In other instances, the barrier plies traverse only portions of the pressure vessel.

In a second set of embodiments, methods are provided of fabricating an all-composite pressure vessel or storage tank with integral barrier. The fabrication method comprises first disposing fiber-reinforcement material for the barrier ply (or plies) onto a removable or extractable mandrel, the mandrel providing the three-dimensional shape for the interior of the completed pressure vessel or tank. The barrier-ply fiber-reinforcement material is then impregnated with barrier-ply resin while the fiber-reinforcement material is disposed on the mandrel. The non-barrier-ply fibers and resin are then wound over the barrier plies using standard filament-winding techniques. Finally, the resins in the barrier and non-barrier plies are cured, and the mandrel is removed from the integrated plies.

In some instances, the barrier plies are fabricated and cured first, and subsequently serve as the mandrel for fabrication of the non-barrier plies. Such a barrier may be produced by forming resin-impregnated braided ply on a secondary removable mandrel, which is extracted out after curing the resin-impregnated braided ply. Such a barrier may be produced using resin-transfer molding (RTM), vacuum-assisted resin-transfer molding (VARTM), filament winding, fiber placement or centrifugal casting.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 1A provides an illustration of a conventional filament-would composite pressure-vessel shell;

FIG. 1B provides a schematic illustration of the structure of plies provided on a pressure-vessel of the type shown in FIG. 1B to illustrate stresses applied to the pressure-vessel shell;

DETAILED DESCRIPTION OF THE INVENTION

Figure 2:
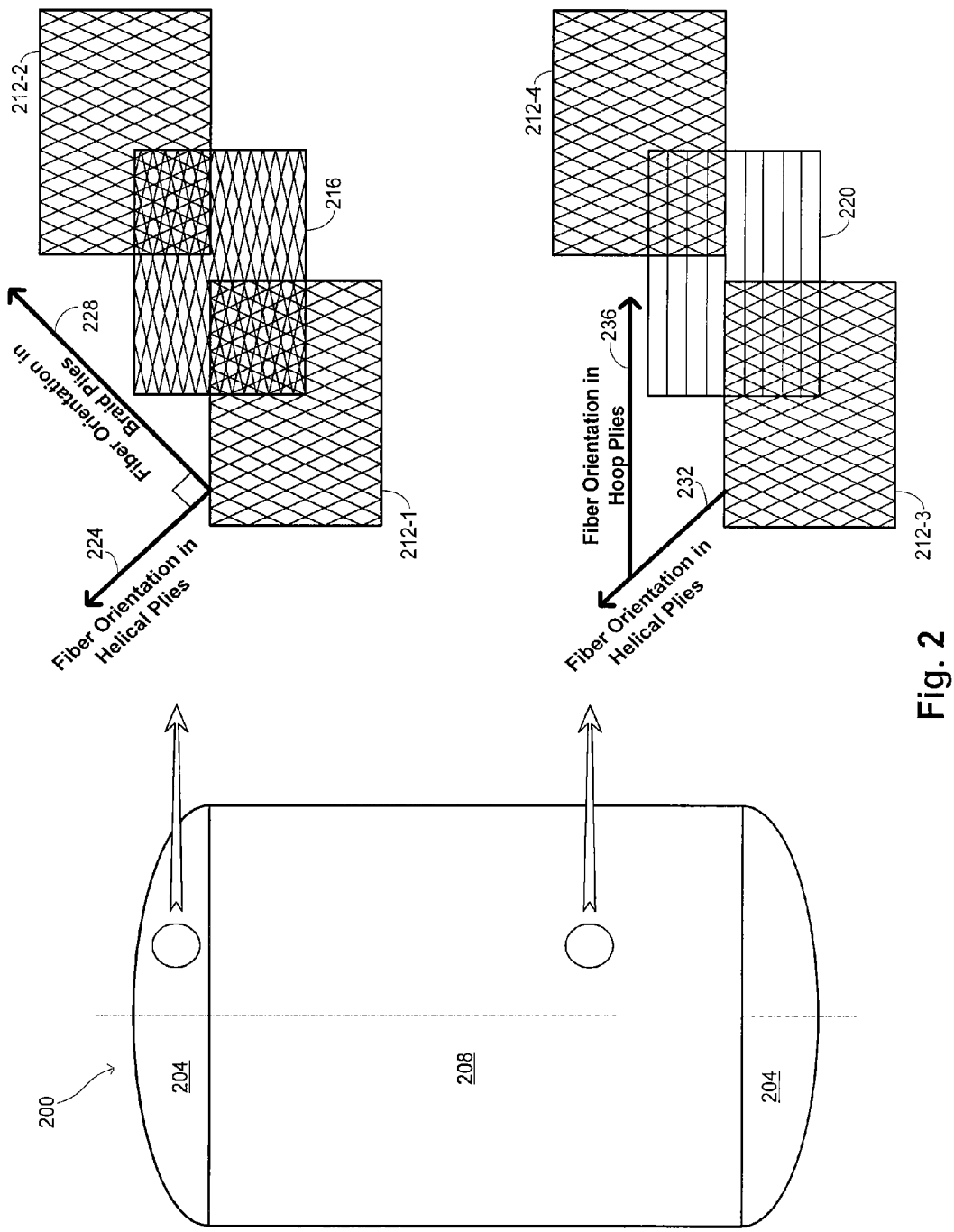
FIG. 2 provides a schematic illustration of a structure of a linerless vessel made in accordance with an embodiment of the invention and of stresses applied to the shell of such a vessel.

One embodiment of the invention makes use of braided barrier plies to provide an integrated damage barrier in cylindrical filament-wound all-composite pressure vessels with domed end regions. The structural strains that cause a conventional cylindrical linerless-pressure vessel structure to be susceptible to leakage are illustrated with the drawings in FIGS. 1A and 1B. FIG. 1A shows the general structure of a conventional cylindrical linerless pressure vessel 100. The composite laminate in the cylindrical section comprises interspersed layers of circumferential "hoop" plies 108 and helical plies 104. The helical plies 108 may cross with angles ±φ. The composite laminate in the dome section includes only the helical plies 104. The "knuckle area" in the dome section is generally the thinnest section of the pressure vessel 104 and needs to transition the high circumferential stresses in the cylindrical section to the dome section.

FIG. 1B provides a schematic illustration of how the stresses may be accommodated in the cylindrical section with a combination of hoop and helical plies. The drawing shows the hoop ply 108 sandwiched between two helical plies 104, allowing the stresses 116-128 to be accommodated by an arrangement that flanks composite plies with plies having nearly orthogonal fiber orientation. Specifically, the structure permits circumferential stresses 116 and 120 to be accommodated at the same time as transverse stresses 124 and 128 are accommodated. These stresses are approximately proportional to the radius of curvature R of the cylindrical section, with the circumferential stresses 116 and 120 being approximately double the transverse stresses 124 and 128. In a conventional linerless-pressure vessel structure, high strains that act perpendicular to the fibers cause the composite plies to microcrack and create an interconnected pathway for leakage. Typically, the knuckle region is where linerless composite pressure vessels will first leak due to the combination of high local stresses and thin-wall construction.

In considering how to provide a tough, ductile, microcrack-resistant barrier layer to mitigate this failure mode, the inventors developed the concept of incorporating a braided ply with highly-toughened resin material. One desirable feature that the inventors recognized in the braided ply is its drapability and the tendency for its fibers to scissor to angles that are nearly orthogonal to the existing helical plies in the dome region. Furthermore, the inventors envisioned that the braid angle (FIG. 4) could be adjusted to maximize strength and stiffness of the barrier layer in the knuckle region and ensure first-ply failure within the cylindrical region (where stresses and strains are uniform and more-easily predicted).

This technique was identified as having certain benefits over current designs for metal and polymer liners in Type-III and Type-IV pressure vessels, respectively. Foremost, it is difficult to precisely predict stress levels at which current liners will fail. Hence, current metal and polymer liners tend to be over-designed (i.e., thicker than necessary from the perspective of leak prevention). This coupled with the fact that most current liners are not designed to contribute significant stiffness and strength to the tank structure leads to the situation that current liners represent parasitic (i.e., non-structural) mass. By contrast, the technique presented here offers the opportunity to minimize non-structural mass penalty by ensuring that the barrier layer contributes a percentage of the overall stiffness and strength of the pressure vessel structure, while also exhibiting a very-well-defined leakage-failure strength.

Furthermore, manufacturing of a metal or polymer liner and its associated quality control adds significant expense. By integrating a composite barrier ply during the manufacturing process or by allowing the barrier plies to be used as a mandrel for the pressure vessel manufacturing, embodiments of the invention avoid the cost and complexity of such an additional part.

Embodiments of the invention thus incorporate resin-impregnated braided ply (or plies) either as an internal barrier or in between traditional filament-wound composite plies of a linerless composite pressure vessel. The braided ply may be cured before the filament winding process or can be co-cured together with the rest of the composite shell. Inclusion of the braided ply thus provides a microcrack-resistant, ductile barrier layer in which the fibers are inclined relative to the helical plies. In some embodiments, the braided fibers in the barrier plies are substantially orthogonal to the helical fibers in the non-barrier plies. The braided ply in the dome section accomplishes a stress distribution similar to that achieved by the hoop ply in the cylindrical section by interspersing plies that are inclined relative to the filament-would dome-section helical plies. Ultimately, this embodiment could substantially increase strength in the knuckle region, where microcrack-induced leaks are often seen in linerless composite pressure vessels.

This effect is illustrated schematically in FIG. 2, which shows a structure for a linerless pressure vessel 200 in accordance with an embodiment of the invention. The pressure vessel 200 includes a cylindrical section 208 and at least one dome section 204. While it is generally expected that the cylindrical section 208 will have a right circular cross section, it is possible for other cross-sectional shapes to be used in other embodiments. For instance, elliptical cross sections might be used, particularly if the eccentricity of such an elliptical cross section is small. As used herein, the term "cylindrical" is thus not intended to be limited to right circular cross sections. The dome section 204 may also take on a variety of different forms in different embodiments, including hemispherical, semi-hemispherical, geodesic, and elliptical dome shapes, among others. Embodiments of the invention that include a braid ply have the effect of reducing resin microcracking incidence even with these different structures.

As the bottom portion of FIG. 2 illustrates, the presence of a hoop ply 220 sandwiched between helical plies 212 in the cylindrical section 208 causes there to be fiber orientations 232 and 236 that are inclined relative to each other. This effect is approximately mimicked in the dome section 204 by including a braid ply 216 in addition to the helical plies 212. The resulting fiber orientations 224 and 228 are shown in the illustration to be substantially orthogonal, although other orientations might result in specific configurations that are also effective at distributing stress. Note, the relative angles of the helical and braid plies in the dome region vary with longitudinal location in the dome.

If the barrier ply(ies) traverses both the dome and cylindrical sections of the pressure vessel, and if the barrier ply(ies) is made of a cylindrical braid (or weave) whose diameter can be reduced or increased by decreasing or increasing the braid angle (FIG. 4), then the braid angle will be constant in the cylindrical section and will vary through the dome section. If desired, the braid angle can be set within the cylindrical section to ensure first failure of the barrier ply(ies) in this region.

There are a number of different braid structures that may be used for the braid ply(ies) in different embodiments. A braid structure is formed by the diagonal intersection of fibers. It is formed with three or more fibers intertwined in such a way that no two fibers are twisted around one another. In some respects, a braid structure has features in common with a weave or with a filament-wound structure. For example, filament winding is a process of winding fiber on a mandrel surface by rotating the mandrel while a delivery head positions fibers on the surface. Filament-winding machines make use of machine motion control over one or more axes of motion. These include a mandrel rotational axis, a horizontal carriage-motion axis, and a radial carriage-motion axis. Additional axes are sometimes added in filament winding, such as by including a rotating-eye axis or a yaw-motion axis, or still other axes. Braided materials are similar to woven materials in that braided fibers are mechanically interlocked with each other. When a braid is prepared as a tubular structure, it provides seamless fiber continuity in a manner similar to filament winding.

Figure 3A:
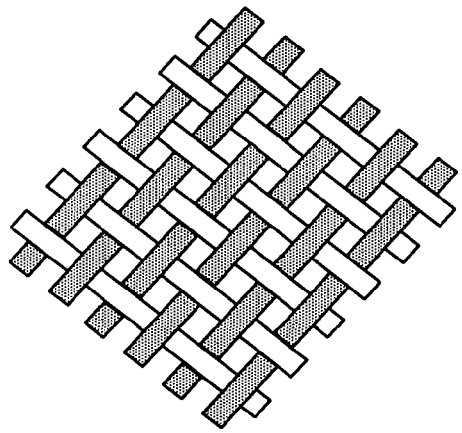
FIGS. 3A-3C show different examples of braid structures that may be used in various embodiments of the invention.
Figure 3B:
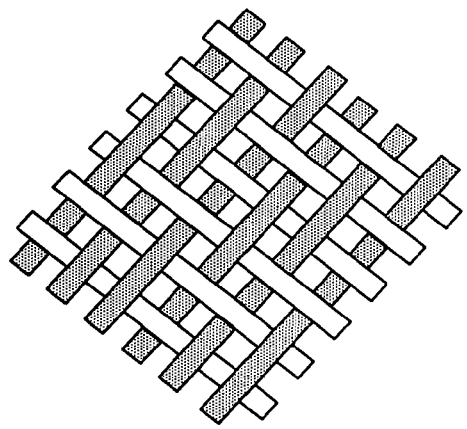
Figure 3C:
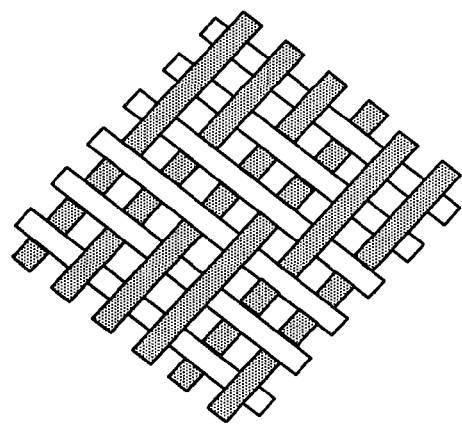

There are a number of different braiding patterns that may be used in different embodiments of the invention. Some of the more commonly used braiding patterns are illustrated in FIGS. 3A-3C. Each of the braid patterns shown in FIGS. 3A-3C is an example of a "biaxial" braid architecture, which makes use of two sets of fibers. Other braid architectures that may be used include triaxial architectures that use three sets of fibers. One set of triaxial architectures adds a third set of fibers in an axial direction to a biaxial architecture without interlacing or intertwining the third set of fibers with the fibers of the biaxial architecture. Inclusion of this third set of fibers achieves unidirectional and off-axis reinforcement within a single layer.

Figure 4:
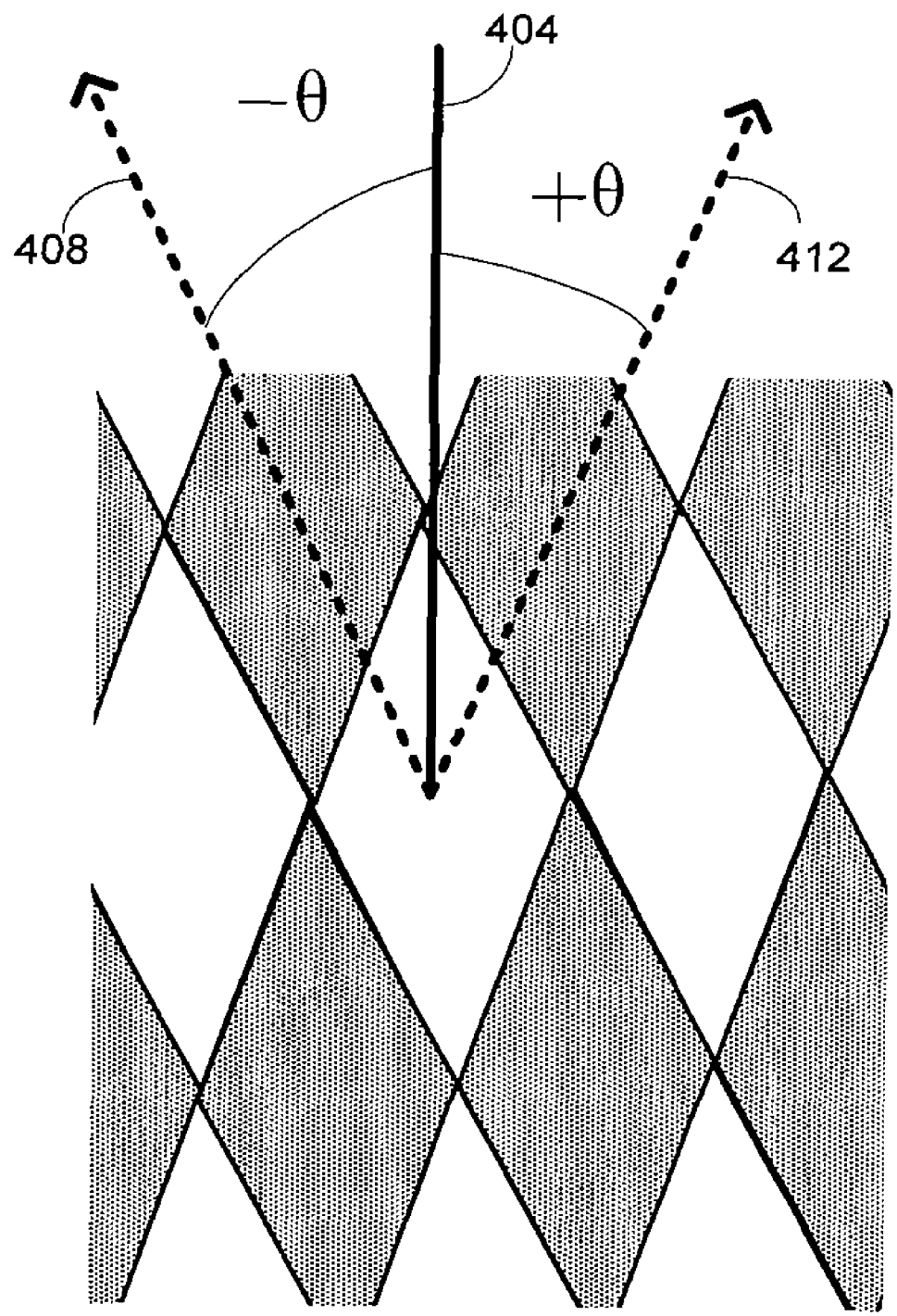
FIG. 4 provides an illustration of the definition of a braid angle.

In addition to being characterized by its pattern and form, a braid may be characterized by a "braid angle." This is illustrated in FIG. 4, which shows a biaxial braid being formed with a set of shaded fibers and a set of unshaded fibers. The braid axis is denoted by reference number 404, with the unshaded fibers being drawn along a first direction 408 oriented an angle −θ relative to the braid axis 404 and the shaded fibers being drawn along a second direction 412 oriented an angle +θ relative to the braid axis 404. The orientation θ is referred to as the "braid angle" and is typically between 15° and 75°. In the illustrative braid patterns shown in FIGS. 3A-3C, the biaxial braids have a braid angle of about 45° so that the fibers are substantially orthogonal to each other. The braid angle is also sometimes referred to in the art as the "fiber angle" or the "bias angle".

Braid is advantageously used in embodiments of the invention because of its high efficiency in distributing loads, mitigating growth of microcracks, voids and manufacturing induced flaws and in providing a ductile, damage resistant barrier layer. The fibers within a braided structure are continuous and mechanically locked, providing a natural mechanism form distributing loads throughout its structure. This efficient load distribution also makes braided structures very resistant to impacts. Because all the fibers in a braided structure are involved in a loading event, the braid absorbs a great deal of energy as it fails. Braided structures are thus also effective at arresting fatigue failures. Like filament-wound structures, braided fibers are helically coiled, but they have the additional feature of being mechanically interlocked. As a structure is exposed to high fatigue cycles, cracks will propagate through the matrix of filament-wound or unidirectional prepreg laid-up structures. But when cracking occurs in a braided structure, its propagation is arrested at the intersections of the reinforcing fibers. Furthermore, when braids are nested with other braids to produce braided composites, there is virtually no delamination when subjected to fatigue loadings. Because the layers of a composite braid move together, it is rare for cracks to form and propagate between layers of braided reinforcement.

The architecture of braid provides natural conformability, making it unnecessary to cut, stitch, or otherwise manipulate the fiber when placing it.

Figure 5:
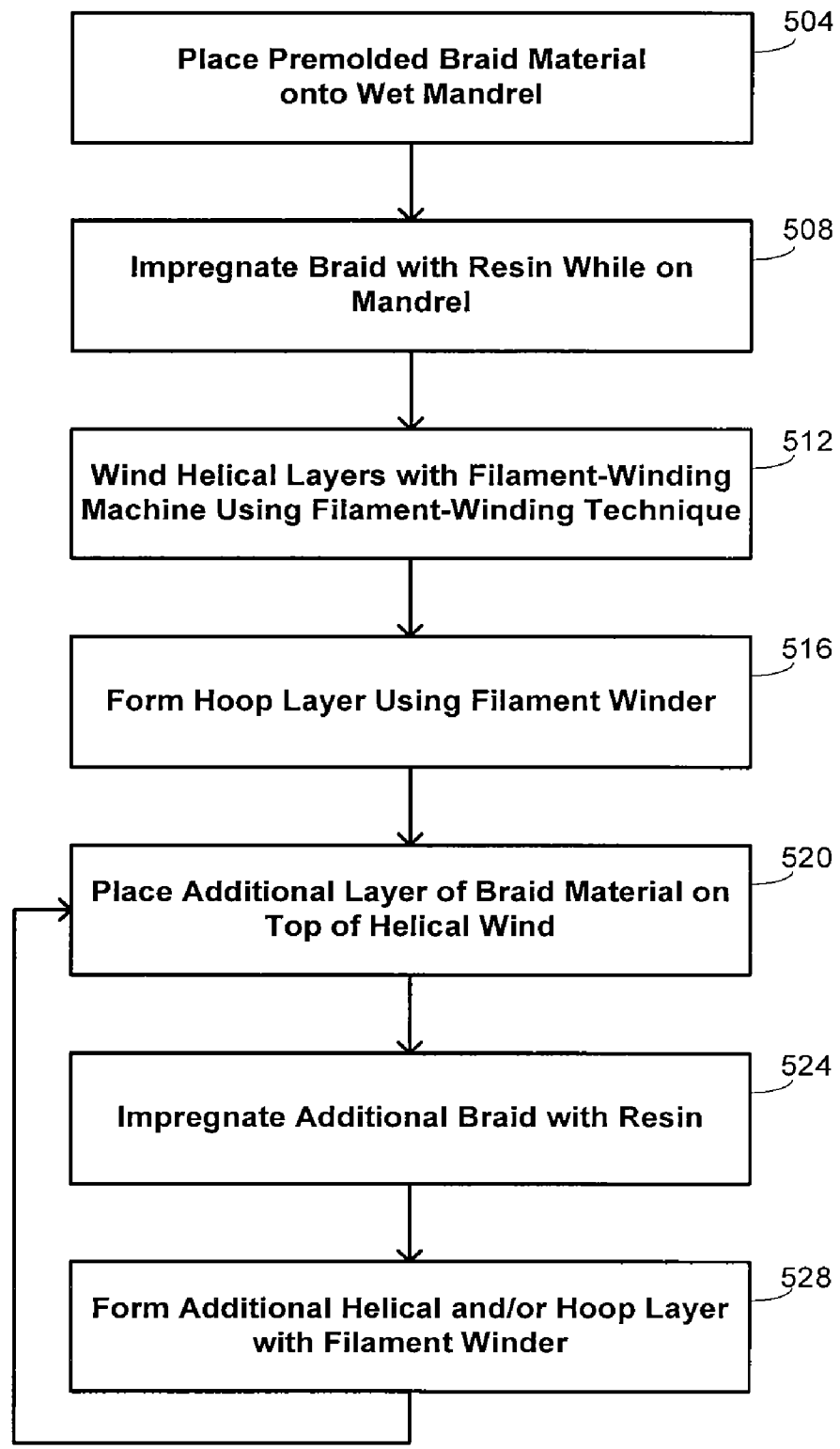
FIG. 5 is a flow diagram summarizing aspects of methods of forming a linerless composite pressure vessel in which the barrier plies only traverse portions of the pressure vessel.

In some embodiments, a linerless pressure vessel that incorporates one or more braided plies that traverse only a portion of the pressure vessel may be fabricated according to the method illustrated with the flow diagram of FIG. 5. Although this flow diagram sets forth a number of specific steps and provides an exemplary order for performing the steps, this is not intended to be limiting. Additional steps may be performed in some embodiments, and in other instances, some of the steps may be omitted. Furthermore, the steps may sometimes be performed in an order different from that indicated.

For the illustrated embodiment, the manufacturing process begins at block 704 by placing premolded braid material onto a mandrel. The braid material may be prepared by cutting a dry length of the material into an approximated shape of the mandrel. The length of fabric may then be premolded to fit the shape of the mandrel while still in a dry state. The mandrel generally has a shape that conforms to the desired shape of the linerless pressure vessel. That is, the mandrel may have a cylindrical section and at least one domed section. It is not necessary at this step to completely cover the mandrel; instead, the premolded braid material may be disposed only over the dome section(s).

As indicated at block 706, the braid is impregnated with resin while disposed on the mandrel. This may be accomplished with a manual or semi-automated process in which an amount of resin is added to the top of the braid material and used to impregnate the braid with resin. Helical layers may be placed into the structure at block 712. This may be accomplished by placing the impregnated braids (i.e., the barrier plies) and mandrel onto a filament-winding machine, thereby placing the helical layers with a filament winding technique.

A second layer of braided material may be added at block 720 and impregnated at block 724 in the same manner as was done for the first braid layer. Additional helical layers and/or hoop layers may be placed with the filament winder at block 728. This process may be repeated multiple times in building up the pressure vessel structure by adding additional braided layers in the same manner as the second braided layer. In some instances, a final braid layer covers the entire pressure vessel instead of only the dome regions.

Once the structure has been completed it may be removed from the mandrel and completed by sealing the top and bottom of the pressure vessel, a process that may include adding a polar boss to a top of the pressure vessel to provide a mechanism for adding and releasing fluid from the pressure vessel.

Figure 6:
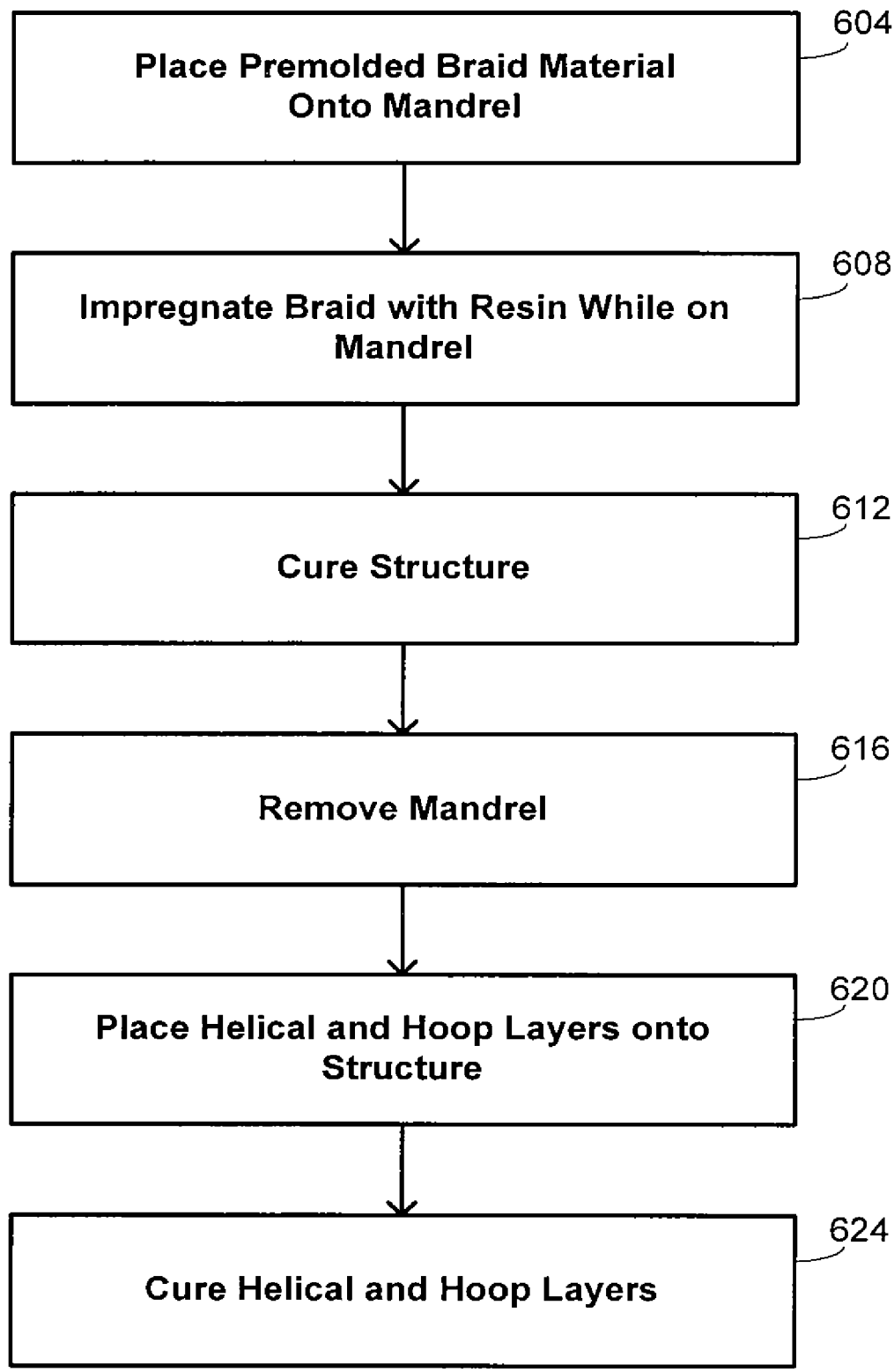
FIG. 6 is a flow diagram summarizing aspects of methods of forming a linerless composite pressure vessel in which the barrier plies traverse the entire pressure vessel.

In some embodiments, a linerless pressure vessel that incorporates one or more braided plies that traverse the entire pressure vessel may be fabricated according to the method illustrated with the flow diagram of FIG. 6. Although this flow diagram sets forth a number of specific steps and provides an exemplary order for performing the steps, this is not intended to be limiting. Additional steps may be performed in some embodiments, and in other instances, some of the steps may be omitted. Furthermore, the steps may sometimes be performed in an order different from that indicated.

For the illustrated embodiment, the manufacturing process begins at block 604 by placing premolded braid or woven material onto a mandrel. The braid or woven material may be prepared by cutting a dry length of the material into an approximated shape of the mandrel. The length of fabric may then be premolded to fit the shape of the mandrel while still in a dry state. The mandrel generally has a shape that conforms to the desired shape of the linerless pressure vessel. That is, the mandrel may have a cylindrical section and at least one domed section. At this step, the mandrel may be completely covered, including any polar bosses, to provide a mechanism for adding and releasing fluid from the pressure vessel.

As indicated at block 608, the braid or woven plies are impregnated with resin while disposed on the mandrel. This may be accomplished with a manual process in which an amount of resin is added to the top of the braid or woven material and used to impregnate the braid with resin by hand. Alternatively, this may be accomplished with a cost-effective, high-volume-production-friendly automated or semi-automated process, such as through the use of resin-transfer molding ("RTM"), vacuum-assisted resin-transfer molding ("VARTM") or centrifugal casting and an outer-surface mold that, in concert with the inner mandrel, define the finished dimensions of the braided barrier plies. The resin and the inner mandrel may be pressurized during this impregnation process to result in a part that comprises the braided or woven plies that has high dimensional tolerance and good thickness uniformity.

Once the impregnation of the braided plies with resin is complete, the structure is cured at block 612 and the mandrel is removed at block 616 after completion of the cure. The cured set of braided plies has a shape that conforms to the desired shape of the linerless pressure vessel and acts as the nonbarrier plies of the pressure vessel. It is used as a mandrel for subsequent filament-winding operations.

At block 620, helical and hoop layers are placed into the structure. This may be accomplished by placing the resin-impregnated fiber tows on the mandrel using a filament-winding machine. The filament-wound helical and hoop layers provided the nonbarrier plies of the pressure vessel. The mandrel that comprises the braided or woven plies may be pressurized during the filament-winding process to improve the consolidation of the hoop and helical plies and to enhance the mechanical properties of the non-barrier plies. The filament-wound helical and hoop layers are cured at block 624 and the fabrication of the pressure vessel is then complete.

In some alternative embodiments, the braided ply is applied in situ during pressure vessel fabrication using the overbraiding process described above. In other embodiments, the mandrel itself comprises a braided core. For example, a core may be fabricated by forming resin-impregnated braided ply on a secondary washable mandrel. The braid plies are then partially or fully cured and the secondary mandrel is washed out. The resulting core is then used as a mandrel for filament winding the composite pressure vessel as described in connection with FIG. 7. Techniques that may be used for forming a core of braided plies include a resin-transfer molding process, such as a vacuum-assisted resin-transfer molding process, or may include a resin-infusion process, or a centrifugal casting process, in addition to other processes.

Example

In one example, a 6 in. dia.×7 in. long, 1.9-L filament-wound linerless pressure vessel was fabricated without any braided ply. The pressure vessel had a weight of 295 grams and failed by leakage, showing a visible spray of water at the knuckle area, at 1000 PSI when subjected to hydrostatic pressure. A comparable pressure vessel with two braided plies interspersed between the normal filament-wound layers throughout the dome regions, but not within the cylindrical region of the pressure vessel had a weight of 315 grams and failed by leakage at 2600 PSI when subjected to hydrostatic pressure. Thus, the inclusion of braided plies selectively in the dome regions that increased the weight by 6.7% provided a performance improvement in excess of 150%.

In another example, a 6 in. dia.×7 in. long, 1.9-L filament-wound linerless pressure vessel was fabricated in two steps and incorporating barrier plies throughout the pressure vessel. First braided barrier plies were formed, impregnated, and cured on a washable mandrel. The mandrel was washed out after the barrier plies were cured. The cured barrier plies were used as a mandrel for filament winding of the remainder of the pressure vessel. This pressure vessel had a weight of 516 grams and failed by rupture at 5500 PSI when subjected to hydrostatic pressure. Thus, the inclusion of braided plies as the innermost barrier layer increased the weight by 75% provided a performance improvement in excess of 450% over a pressure vessel with no braided plies.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An all-composite pressure vessel or storage tank defining an enclosed interior volume and comprising:
    a plurality of structural plies;
    one or more barrier plies comprising:
        reinforcement fibers that impart a predictable, burst-strain capacity to the barrier plies; and
        a polymeric resin that provides a resistance to microcracking and incipient leakage under pressurization and leading up to strains that exceed the burst-strain capacity of the barrier plies;
    wherein the barrier plies exhibit a burst strain that is less than a burst strain exhibited by the plurality of structural plies.

2. The all-composite pressure vessel or storage tank recited in claim 1 wherein the fibers in the barrier plies are filament-wound or fiber-placed.

3. The all-composite pressure vessel or storage tank recited in claim 1 wherein the fibers in the barrier plies are braided or woven.

4. The all-composite pressure vessel or storage tank recited in claim 1 wherein the fiber in each of the barrier plies are divided into two sets of fibers intersecting each other at an angle that results in a substantially uniform tensioning of both sets of fibers in reaction to internal pressurization of the pressure vessel or storage tank.

5. The all-composite pressure vessel or storage tank recited in claim 1 wherein the polymeric resin is highly ductile.

6. The all-composite pressure vessel or storage tank recited in claim 1 wherein the first mode of failure under pressurization is rupture of the barrier plies, leading to leakage of the pressurized contents.

7. The all-composite pressure vessel or storage tank recited in claim 1 wherein barrier and nonbarrier plies exhibit substantially equivalent in-plane thermal-expansion coefficients.

8. The all-composite pressure vessel or storage tank recited in claim 1 wherein barrier and nonbarrier plies exhibit substantially equivalent electrical and galvanic properties.

9. The all-composite pressure vessel or storage tank recited in claim 1 wherein the barrier plies carry a predetermined fraction of a total load that develops within the all-composite pressure vessel or storage tank in response to internal pressurization.

10. The all-composite pressure vessel or storage tank recited in claim 1 wherein the barrier ply is an innermost barrier layer for the all-composite pressure vessel or storage tank.

11. The all-composite pressure vessel or storage tank recited in claim 1 wherein each nonbarrier ply is disposed between two barrier plies.

12. The all-composite pressure vessel or storage tank recited in claim 1 wherein each barrier ply is disposed between two nonbarrier plies.

13. The all-composite pressure vessel or storage tank recited in claim 1 wherein nonbarrier plies are interleaved with barrier plies.

14. The all-composite pressure vessel or storage tank recited in claim 1 wherein the barrier plies traverse all sections of the all-composite pressure vessel or storage tank.

15. The all-composite pressure vessel or storage tank recited in claim 1 wherein the barrier plies traverse only portions of the all-composite pressure vessel or storage tank.

16. A storage tank comprising:
one or more barrier layers comprising
a plurality of fibers;
a ductile resin; and
a plurality of non-barrier layers,
wherein the first mode of failure under pressurization is rupture of the barrier layer.

17. A storage tank comprising:
one or more barrier layers comprising a plurality of braided fibers and a ductile resin; and
a plurality of structural layers comprising fibers and resin, wherein at least one of the structural layers is disposed over one of the barrier layers,
wherein the first mode of failure under pressurization is rupture of the barrier layer.

* * * * *